(12) United States Patent
Lee (10) Patent No.: US 7,984,936 B2
(45) Date of Patent: Jul. 26, 2011

(54) LATCH MECHANISM

(75) Inventor: Ming-Chang Lee, Taipei Hsien (TW)

(73) Assignee: Hon Hai Precision Industry Co., Ltd., Tu-Cheng, New Taipei (TW)

( * ) Notice: Subject to any disclaimer, the term of this patent is extended or adjusted under 35 U.S.C. 154(b) by 705 days.

(21) Appl. No.: 11/962,110

(22) Filed: Dec. 21, 2007

(65) Prior Publication Data

US 2009/0140531 A1    Jun. 4, 2009

(30) Foreign Application Priority Data

Dec. 4, 2007    (CN) .......................... 2007 1 0202844

(51) Int. Cl.
*E05C 1/06* (2006.01)
(52) U.S. Cl. .................................. 292/150; 292/169.14
(58) Field of Classification Search ................... 292/150, 292/DIG. 38, DIG. 37, 169.14 X, 169.18
See application file for complete search history.

(56) References Cited

U.S. PATENT DOCUMENTS

| | | | | |
|---|---|---|---|---|
| 4,597,599 A * | 7/1986 | Bisbing | | 292/174 |
| 6,149,213 A * | 11/2000 | Sokurenko et al. | | 292/340 |
| 6,817,637 B1 * | 11/2004 | Anderson | | 292/340 |
| 6,966,583 B2 * | 11/2005 | Ji et al. | | 292/231 |
| 7,201,411 B2 * | 4/2007 | Bella et al. | | 292/336.3 |
| 7,234,735 B2 * | 6/2007 | Harada | | 292/170 |
| 7,400,497 B2 * | 7/2008 | Zhang et al. | | 361/679.55 |
| 7,549,684 B2 * | 6/2009 | Shi et al. | | 292/37 |
| 2009/0108593 A1 * | 4/2009 | Lee | | 292/164 |
| 2009/0134636 A1 * | 5/2009 | Lee | | 292/174 |

* cited by examiner

*Primary Examiner* — Carlos Lugo
*Assistant Examiner* — Mark Williams
(74) *Attorney, Agent, or Firm* — Frank R. Niranjan (57) ABSTRACT

A latch mechanism for locking a cover unit to a base unit which comprises a bottom panel and a cover panel defining a through hole therein, includes a latch member slidably installed to the bottom panel, a supporting member fixed to the bottom panel and defining a hole therein, a plug received in the hole of the supporting member, a resilient member placed between the supporting member and the bottom panel configured for resiliently driving the plug to move to make a top of the plug extend through the hole of the supporting member to engage in the through hole of the cover panel, and a hook protruding from the cover unit for extending through the through hole of the cover panel to drive the plug to move to engage with the latch member when covering the cover unit to the base unit.

10 Claims, 7 Drawing Sheets

LATCH MECHANISM

BACKGROUND

1. Field of the Invention

The present invention relates to latch mechanisms, and more particularly to a latch mechanism for a portable computer.

2. Description of Related Art

Typically, an electronic device, such as a portable computer, includes a cover unit and a base unit pivotably connected to the cover unit, and a latch mechanism is provided to lock the cover unit to the base unit.

Conventionally, a latch mechanism for locking a cover unit to a base unit, includes a hook installed to the cover unit, and a through hole defined in an upper surface of the base unit. The hook of the cover unit extends through the through hole of the base unit to engage in the base unit for locking the cover unit to the base unit. However, the through hole makes the upper surface of the base unit unaesthetic when the portable computer is open.

What is needed is to provide a latch mechanism for overcoming the above disadvantage.

SUMMARY

In one embodiment, a latch mechanism for locking a cover unit to a base unit which comprises a bottom panel and a cover panel defining a through hole therein, includes a latch member slidably installed to the bottom panel, a supporting member fixed to the bottom panel and defining a hole therein, a plug received in the hole of the supporting member, a resilient member placed between the supporting member and the bottom panel configured for resiliently driving the plug to move to make a top of the plug extend through the hole of the supporting member to engage in the through hole of the cover panel, and a hook protruding from the cover unit for extending through the through hole of the cover panel to drive the plug to move to engage with the latch member when covering the cover unit to the base unit.

Other advantages and novel features of the present invention will become more apparent from the following detailed description of an embodiment when taken in conjunction with the accompanying drawings, in which:

DETAILED DESCRIPTION

Figure 1:
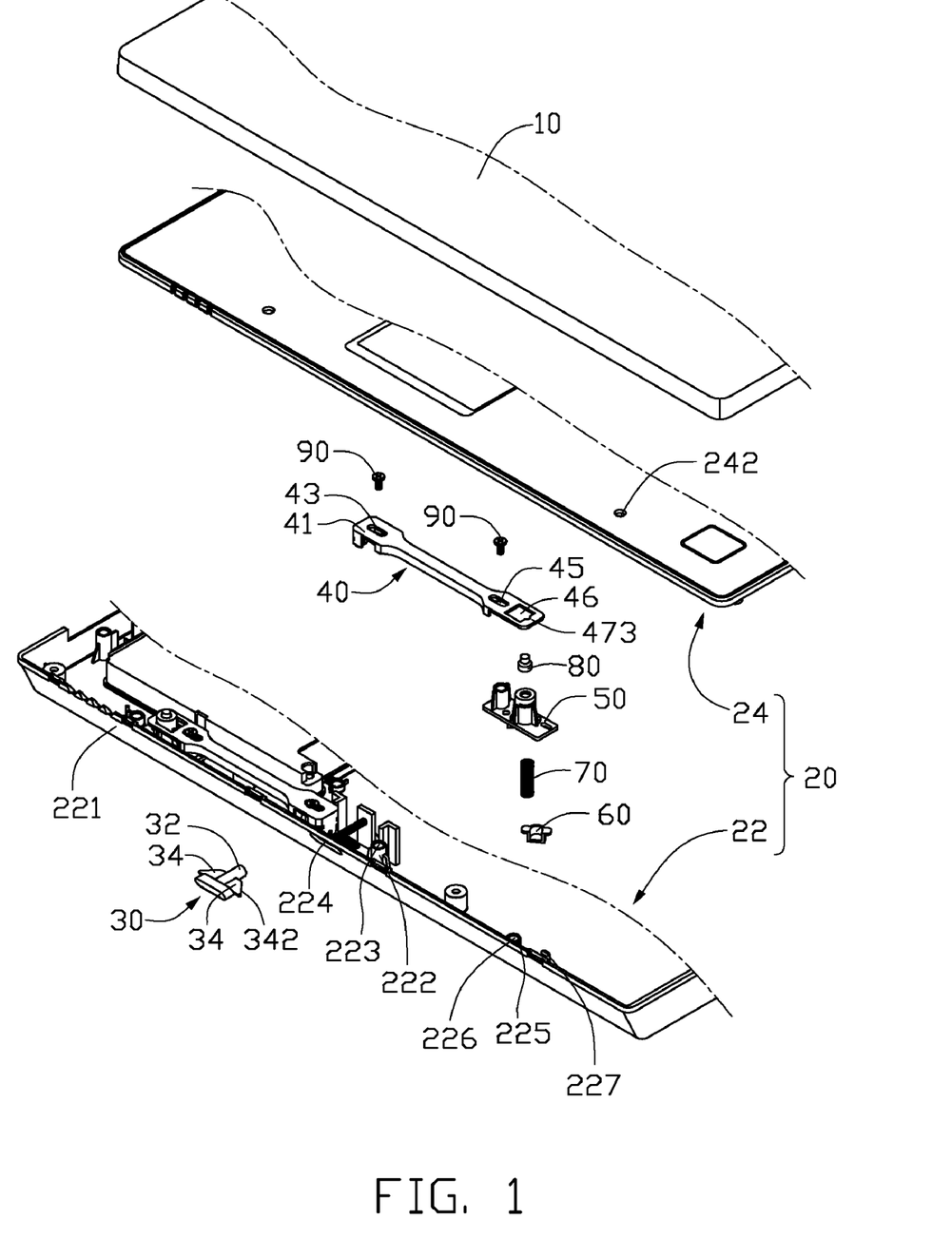
FIG. 1 is an exploded, isometric view of a latch mechanism with a cover unit and a base unit in accordance with an embodiment of the present invention, the base unit including a bottom panel and a cover panel.
Figure 2:
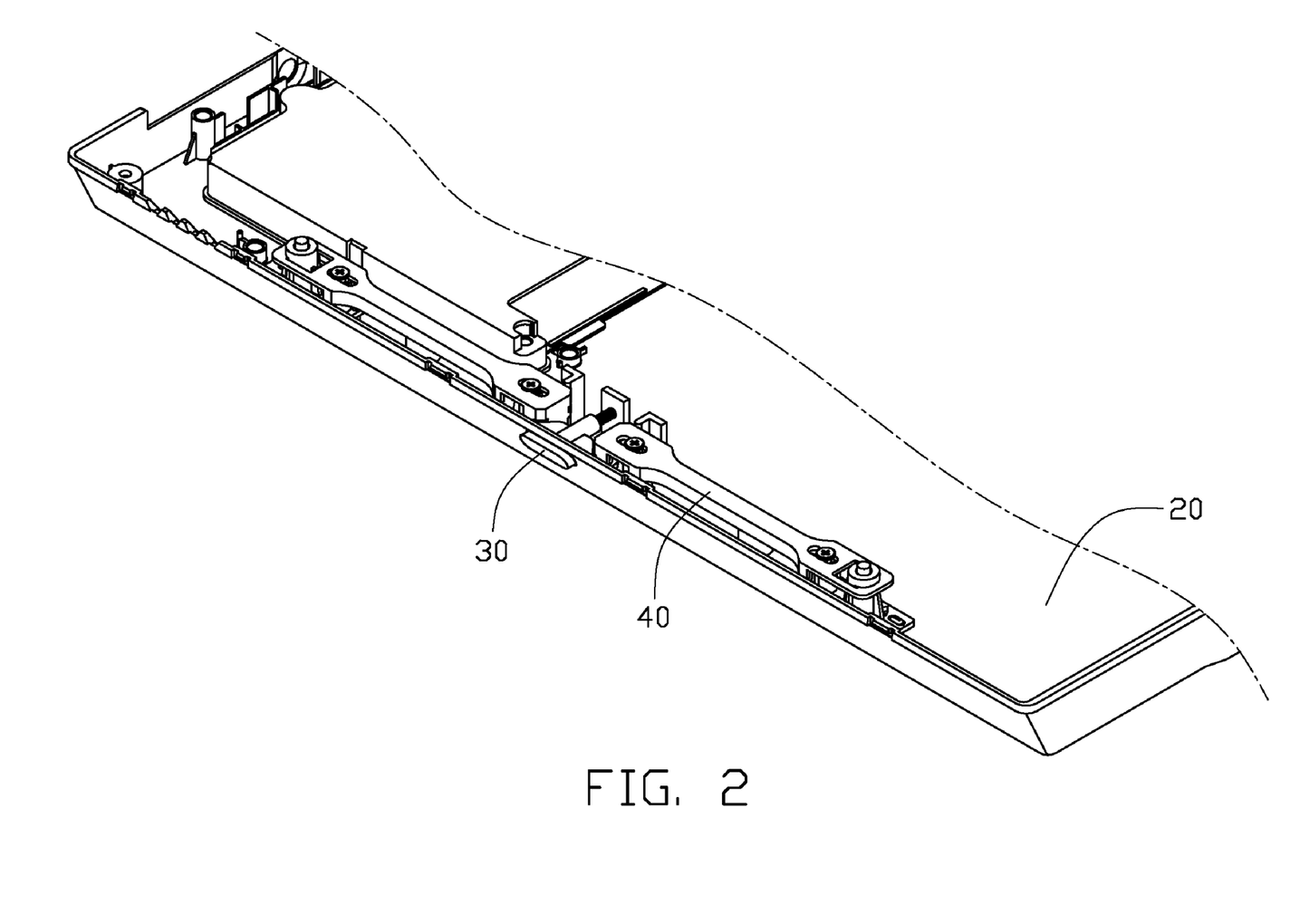
FIG. 2 is an assembled view of the latch mechanism with the bottom panel of FIG. 1.

Referring to FIGS. 1 and 2, a latch mechanism in accordance with an embodiment of the present invention is provided, for locking a cover unit 10 to a base unit 20 of an electronic device, such as a portable computer. The latch mechanism includes a button 30, a latch member 40, a supporting member 50, a mounting member 60, a resilient member 70, and a plug 80. In this embodiment, the resilient member 70 is a coil spring.

Figure 3:
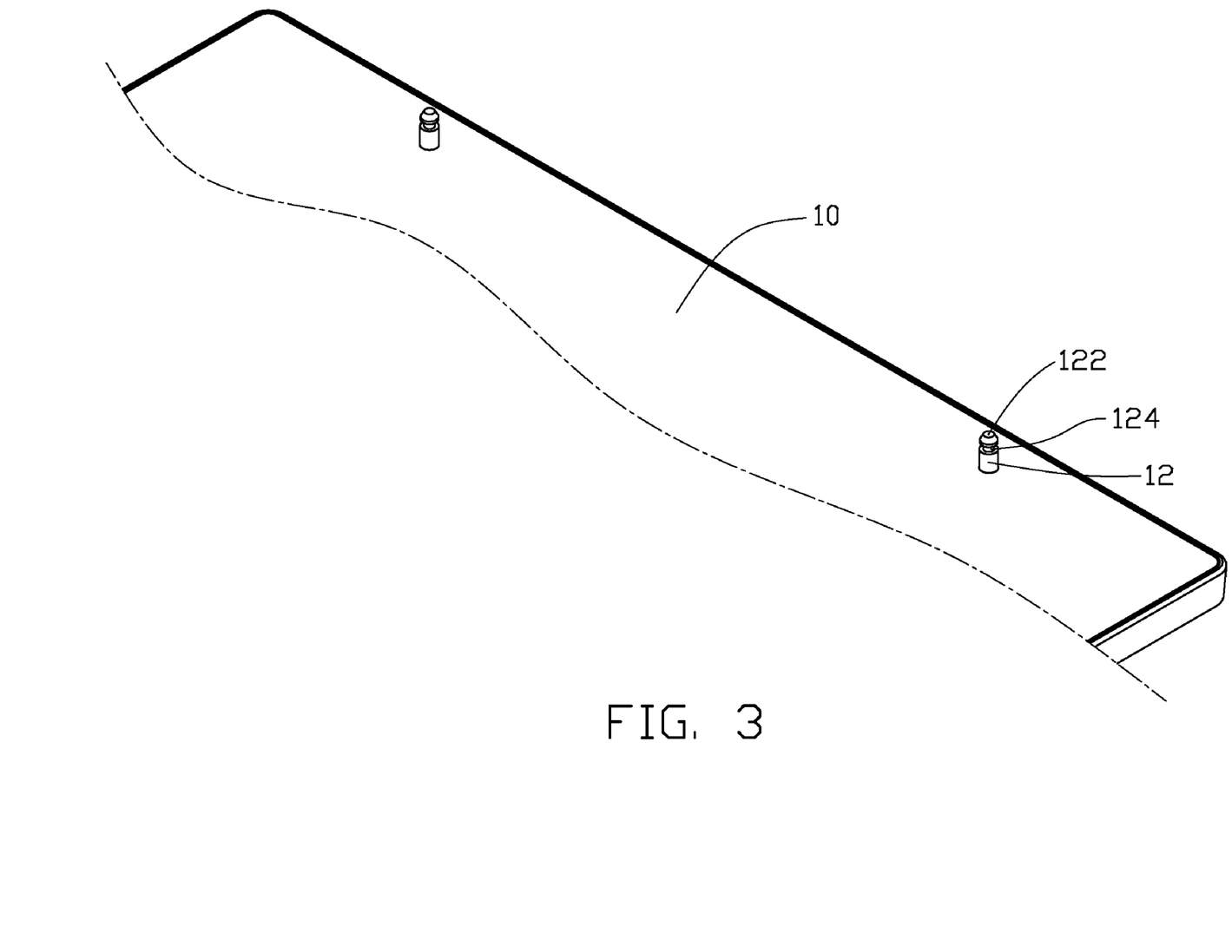
FIG. 3 shows another aspect view of the cover unit of FIG. 1.

Referring also to FIG. 3, the cover unit 10 includes a hook 12 arranged thereon at one side surface thereof. The hook 12 includes a tapered leading portion 122 formed at a free end thereof, and a locking slot 124 defined therein in the vicinity of the leading portion 122.

Referring again to FIG. 1, the base unit 20 includes a bottom panel 22, and a cover panel 24 covered on the bottom panel 22. The bottom panel 22 has a flange 221 extending up from one side thereof. A receiving slot 224 is defined in a middle portion of the flange 221. The bottom panel 22 forms a column 222, a locating rod 227, and a mounting rod 225 adjacent to the locating rod 227. A mounting hole 223 is defined in the column 222. The locating rod 227 and the mounting rod 225 extend from the bottom panel 22 away from the receiving slot 224. A mounting hole 226 is defined in the mounting rod 225. The cover panel 24 defines a through hole 242 therein.

The button 30 includes a columnar portion 32, and two driving portions 34 extending from opposite sides of the columnar portion 32 respectively. Each driving portion 34 is trapezium-shaped, and includes an inclined driving surface 342 opposite to the columnar portion 32.

The latch member 40 is elongate, and includes a locking end and a driven end 41 at opposite ends thereof respectively. A first restricting slot 43 and a second restricting slot 45 are defined in the latch member 40 in the vicinity of the driven end 41, and the locking end respectively. The locking end defines a rectangular hole 46 therein, and a latch portion 473 formed between the edge of the locking end and the rectangular hole 46.

Figure 4:
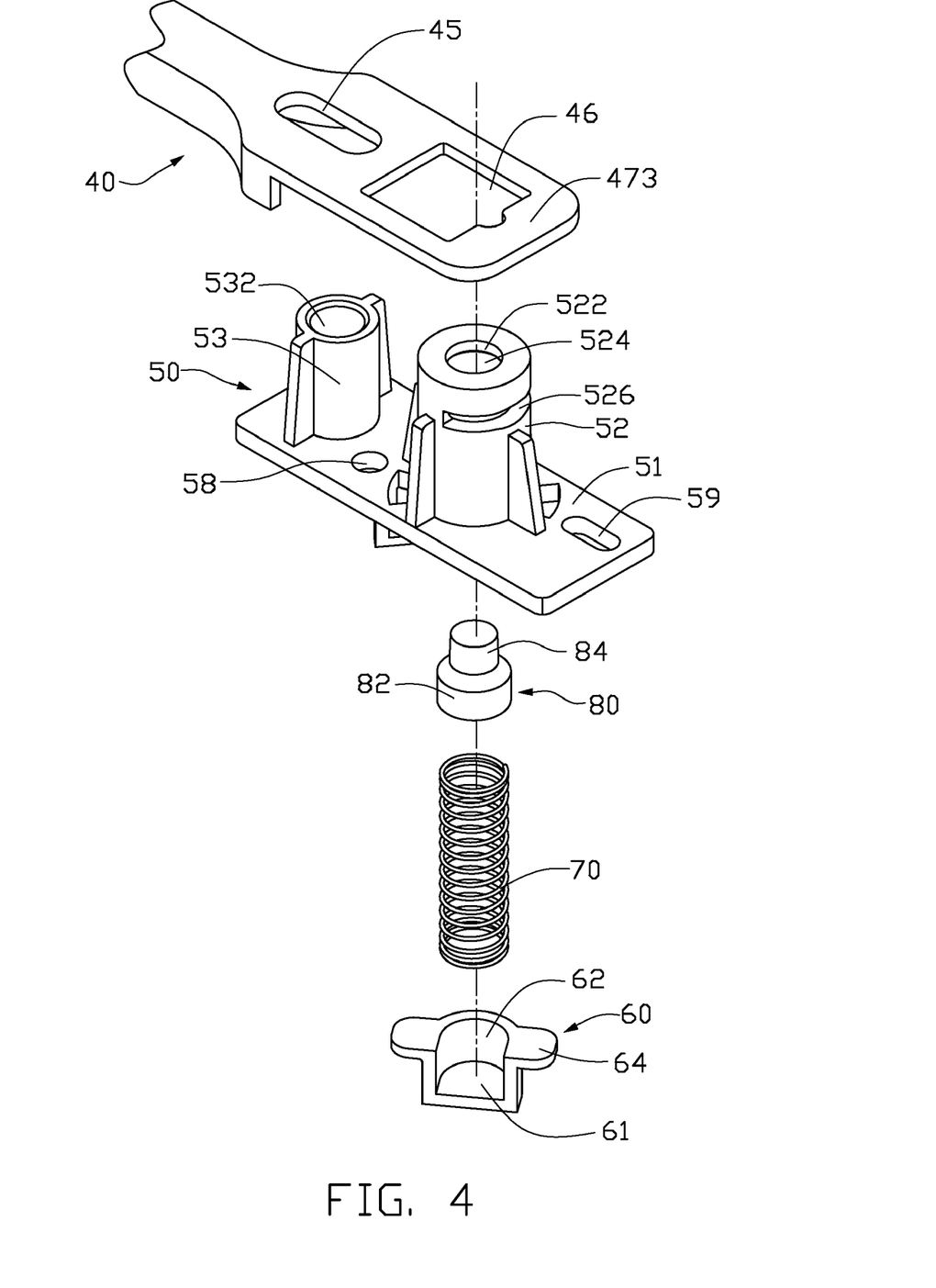
FIG. 4 is an enlarged, partial view of FIG. 1.
Figure 5:
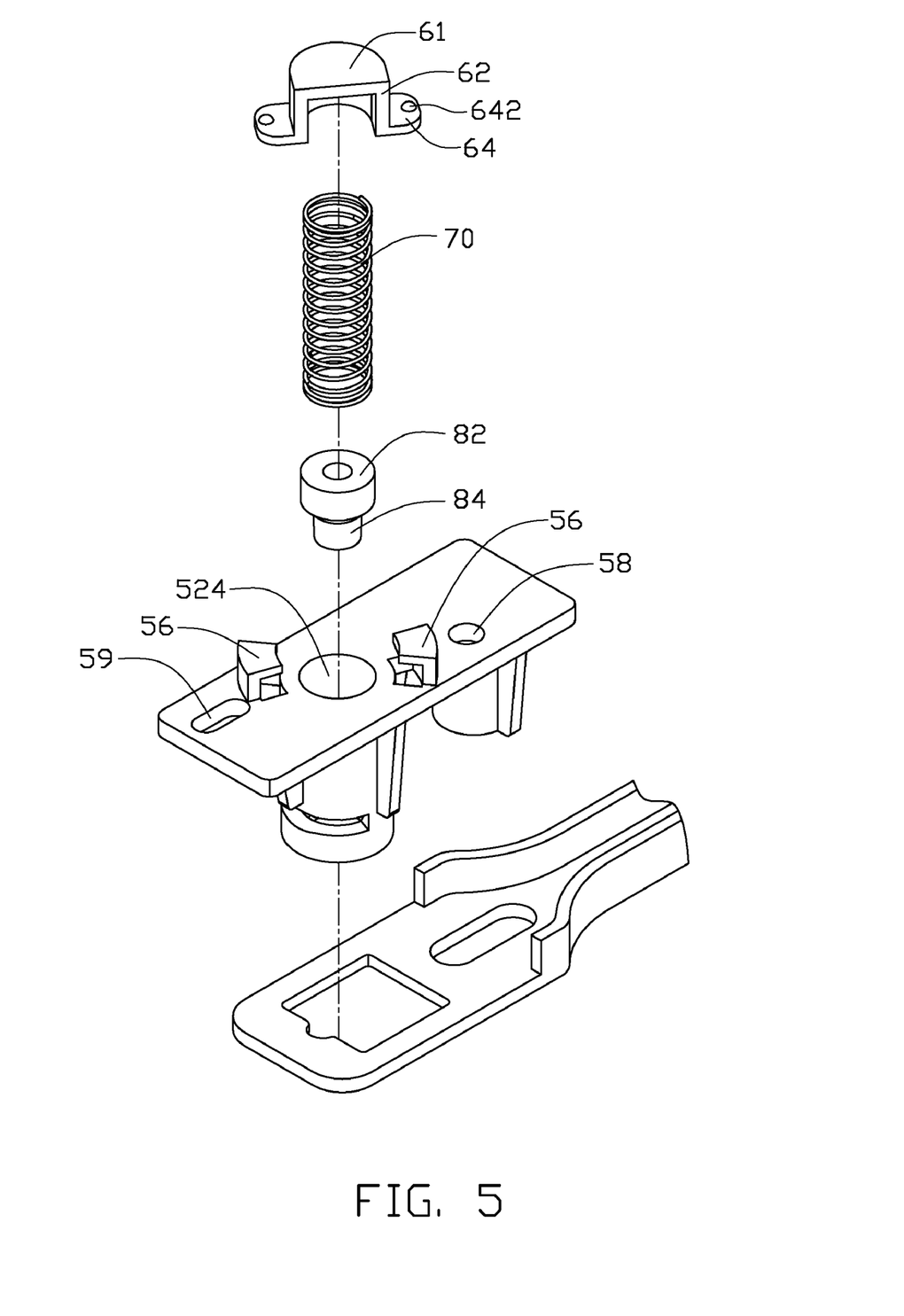
FIG. 5 is similar to FIG. 4, but inverted.

Referring also to FIGS. 4 and 5, the supporting member 50 includes a base plate 51, a columnar receiving portion 52 and a pillar 53 both extending up from the base plate 51. The receiving portion 52 defines a step-shaped hole along an axis thereof. The step-shaped hole includes a through hole 522 defined in a top portion of the receiving portion 52, and a receiving hole 524 at a lower portion of the receiving portion 52 and running through base plate 51 of the supporting member 50. A diameter of the through hole 522 is smaller than that of the receiving hole 524. A slot 526 is defined in the receiving portion 52 perpendicular to the axis of the receiving portion 52 and communicating with the receiving hole 524. A mounting hole 532 is defined in the pillar 53 along its longitudinal axis. Two opposite L-shaped fixing portions 56 protrude down from the base plate 51 at opposite sides of the receiving hole 524 respectively. A mounting hole 58 and a locating hole 59 are defined in the base plate 51.

The mounting member 60 includes a semicircular bottom wall 61 having an arc-shaped side, and a sidewall 62 extending up from the arc-shaped side of the bottom wall 61. Two wings 64 horizontally extend out from opposite ends of the top of the sidewall 62 respectively. A raised portion 642 protrudes down from each wing 64.

The plug 80 is a step-shaped column with a large end 82 at a lower portion and a small end 84 at an upper portion.

Figure 6:
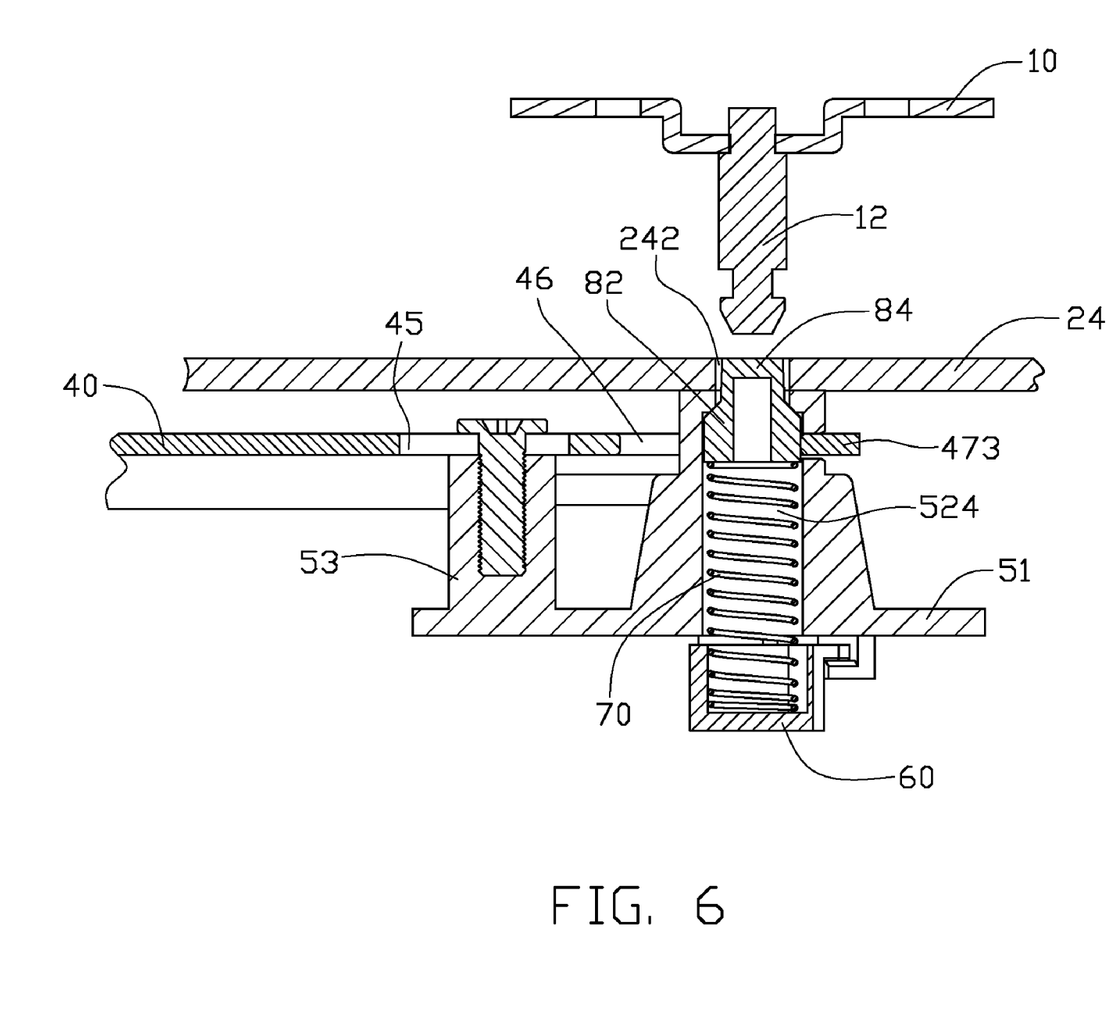
FIG. 6 is a cross-sectional, assembled view of FIG. 1, but showing the latch mechanism in an unlocking state.

Referring also to FIG. 6, in assembly, the plug 80 is received in the step-shaped hole of the supporting member 50 from the bottom with the small end 84 thereof being received in the through hole 522 of the supporting member 50. One end of the resilient member 70 is received in the receiving hole 524 of the supporting member 50 to engage with the large end 82 of the plug 80. The mounting member 60 is fixed to the bottom of the base plate 51 of the supporting member 50 via the wings 64 being inserted into the fixing portions 56 of the supporting member 50 respectively. The raised portions 642 of the wings 64 of the mounting member 60 engage with the corresponding fixing portions 56 of the supporting member 50 respectively. The bottom wall 61 of the mounting member 60 engages with the other end of the resilient member 70.

Referring again to FIG. 2, the supporting member 50 is fixed to the bottom panel 22 via the locating rod 227 engaging in the locating hole 59 and a screw extending through the mounting hole 58 to engage in the mounting hole 226 of the mounting rod 225 of the bottom panel 22. The latch member 40 is slidably attached to the bottom panel 22 via two screws extending through the first restricting slot 43 and the second restricting slot 45 to engage in the mounting hole 223 of the column 222 and the mounting hole 532 of the pillar 53 of the supporting member 50 respectively. One end of the button 30 is received in the receiving slot 224 of the bottom panel 22. A corresponding driving surface 342 of the button 30 engages with the driven end 41 of the latch member 40.

The cover panel 24 is fixed to the bottom panel 22, thereby the base unit 20 is fully assembled. The cover unit 10 is rotatably attached to the base unit 20. The rectangular hole 46 of the latch member 40 aligns with the through hole 242 of the cover panel 24. The resilient member 70 engages with the large end 82 of the plug 80 to make the small end 84 of the plug 80 extend through the through hole 526 of the supporting member 50 to engage in the through hole 242 of the cover panel 24. Therefore the through hole 242 of the cover panel 24 is filled and the exposed surface of the plug 80 is flush with the surrounding area and aesthetic looking, as can be seen in FIG. 6.

Figure 7:
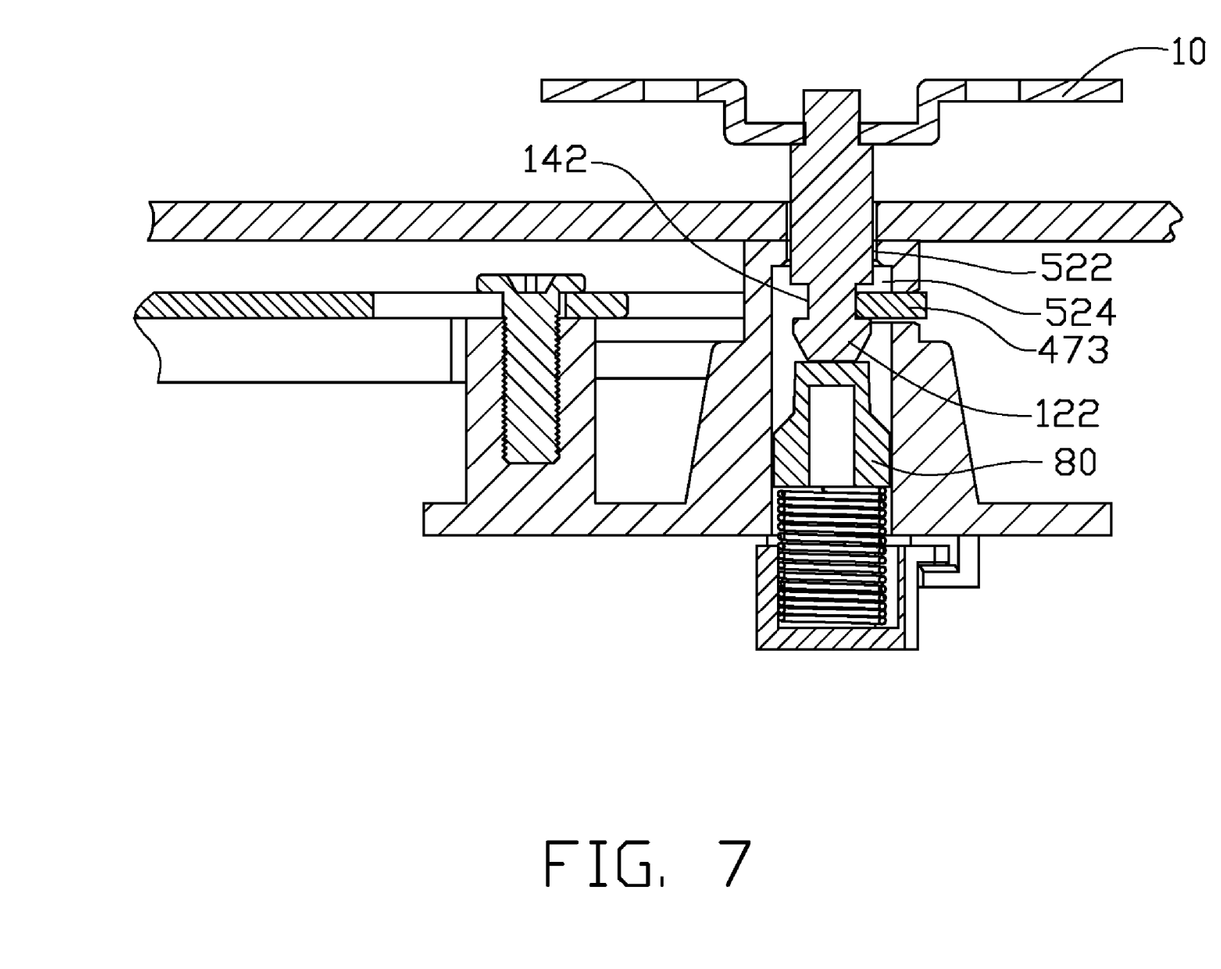
FIG. 7 is similar to FIG. 6, but showing the latch mechanism in a locking state.

Referring also to FIG. 7, the cover unit 10 is rotated to cover the base unit 20 when the electronic device is not in use. The leading portion 122 of the hook 12 of the cover unit 10 engages with the small end 84 of the plug 80 to drive the plug 80 to move down against the resilient member 70. The hook 12 extends through the through hole 242 of the cover panel 24 of the base unit 20 to abut against the latch portion 473 of the latch member 40. The cover unit 10 is further rotated, and the leading portion 122 of the hook 12 drives the latch members 40 to slide away from the button 30. The latch member 40 is capable of being restored by a spring connected between the latch member 40 and the base unit 20 (not shown in picture). When the leading portion 122 of the hook 12 entirely extends through the latch member 40, the spring rebounds to drive the latch member 40 to move back until the latch portion 473 of the latch member 40 is engaged in the locking slot 124 of the hook 12. Thus, the cover unit 10 is locked to the base unit 20.

To unlock the cover unit 10 from the base unit 20, the button 30 is driven to make the driving surface 342 of the driving portion 34 drive the latch member 40 to move away from the button 30. Until the latch portion 473 of the latch member 40 is disengaged from the locking slot 124 of the hook 12, the cover unit 10 can be released from the base unit 20. The resilient member 70 restores to drive the plug 80 to move up with the small end 84 of the plug 80 extending through the through hole 526 of the supporting member 50 to be accommodated in the through hole 242 of the cover panel 24.

As a second embodiment of the present invention, the other end of the resilient member 70 engages with the bottom panel 22 directly to omit the mounting member 60.

It is to be understood, however, that even though numerous characteristics and advantages of the present invention have been set forth in the foregoing description, together with details of the structure and function of the invention, the disclosure is illustrative only, and changes may be made in detail, especially in matters of shape, size, and arrangement of parts within the principles of the invention to the full extent indicated by the broad general meaning of the terms in which the appended claims are expressed.

What is claimed is:

1. A notebook computer comprising a cover unit, a base unit, and a latch mechanism for locking the cover unit to the base unit, the base unit including a bottom panel, a cover panel fixed to the bottom panel, and a through hole defined in the cover panel, the latch mechanism comprising:
   a latch member configured for being slidably installed to the bottom panel and between the bottom panel and the cover panel;
   a supporting member fixed to the bottom panel and defining a hole therein, wherein the hole of the supporting member comprises a receiving hole and a through hole communicating with the receiving hole, the diameter of the through hole is smaller than that of the receiving hole, the supporting member comprises a base plate, and a receiving portion protruding up from the base plate, the hole of the supporting member is defined in the receiving portion along an axis;
   a plug received in the hole of the supporting member, wherein the plug comprises a large end and a small end, the plug and one end of the resilient member is received in the receiving hole, the small end of the plug capable of passing through the through hole of the supporting member;
   a resilient member placed between the supporting member and the bottom panel configured for resiliently driving the plug to move in a manner so as to make a top of the plug extending through the hole of the supporting member to engage in the through hole of the cover panel; and
   a hook protruding from the cover unit for extending through the through hole of the cover panel to drive the plug to move in a manner so as to engage with the latch member when covering the cover unit to the base unit;
   wherein two fixing portions are formed from a bottom of the base plate in the vicinity of the receiving hole, a mounting member is fixed to the supporting member via the fixing portions configured for engaging with the other end of the resilient member;
   wherein the mounting member comprises a bottom wall having an arc-shaped edge, and a sidewall extending up from the arc-shaped edge of the bottom wall, two wings extend outward from two opposite ends of a top of the sidewall for locking in the locking portions of the supporting member respectively; a button operably connected to the latch member so as to drive the latch member out of engagement with the hook.

2. The notebook computer as claimed in claim 1, wherein a slot is defined in a circumference of the receiving portion perpendicular to the axis of the receiving portion and communicating with the receiving hole, the latch member comprises a latch portion for engaging in the slot of the receiving portion to engage with the hook when covering the cover unit to the base unit.

3. The notebook computer as claimed in claim 1, wherein a raised portion protrudes down from each of the wings for firmly engaging with the corresponding locking portion of the supporting member.

4. The notebook computer as claimed in claim 1, wherein the resilient member is a coil spring.

5. An apparatus of an electronic device, comprising:
   a supporting member fixed to the electronic device and defining a through hole and a receiving hole communicating with the through hole, wherein the diameter of the through hole is smaller than that of the receiving hole, wherein the supporting member comprises a base plate, and a receiving portion protruding up from the base plate, the through hole and the receiving hole of the supporting member are defined in the receiving portion along an axis;

a mounting member detachably fixed to the supporting member and aligned with the receiving hole of the supporting member;

a plug received in the receiving hole of the supporting member, wherein the plug comprises a large end and a small end, the small end of the plug capable of passing through the through hole of the supporting member; and a resilient member placed in the receiving hole of the supporting member and located between the supporting member and the mounting member for engaging with the plug to drive the plug to move in a manner so as to make a top of the plug pass through the through hole of the supporting member;

wherein two fixing portions are formed from a bottom of the base plate in the vicinity of the receiving hole, the mounting member is fixed to the supporting member by the fixing portions configured for engaging with the other end of the resilient member;

wherein the mounting member comprises a bottom wall having an arc-shaped edge, and a sidewall extending up from the arc-shaped edge of the bottom wall, two wings extend outward from two opposite ends of a top of the sidewall for engaging with the locking portions of the supporting member respectively.

6. The apparatus as claimed in claim 5, wherein a raised portion protrudes down from each of the wings for firmly engaging with the corresponding locking portion of the supporting member.

7. The apparatus as claimed in claim 5, wherein the resilient member is a coil spring.

8. An electronic device comprising:

a base unit comprises a bottom panel and a cover panel fixed to the bottom panel, wherein a through hole is defined in the cover panel;

a cover unit pivotably attached to the base unit, the cover unit comprising a hook;

a latch member slidably installed to the bottom panel and between the bottom panel and the cover panel;

a supporting member fixed to the bottom panel and defining a hole therein;

a mounting member detachably fixed to the supporting member and aligned with the receiving hole of the supporting member;

a plug received in the hole of the supporting member; and a resilient member received in the hole of the supporting member between the supporting member and the mounting member for engaging with the plug to drive a top of the plug to pass through the hole of the supporting member;

wherein the hook extends through the through hole of the cover panel to press the plug to move against the resilient member to engage with the latch member when covering the cover unit with the base unit;

wherein two fixing portions are formed from a bottom of the base plate in the vicinity of the receiving hole, the mounting member comprises a bottom wall having an arc-shaped edge, and a sidewall extending up from the arc-shaped edge of the bottom wall, two wings extend outward from two opposite ends of a top of the sidewall for locking in the locking portions of the supporting member respectively.

9. The electronic device as claimed in claim 8, wherein the supporting member comprises a base plate, and a receiving portion protruding up from the base plate, the hole of the supporting member is defined in the receiving portion along an axis of the receiving portion, the hole of the supporting member comprises a receiving hole and a through hole communicating with the receiving hole, the diameter of the through hole is smaller than that of the receiving hole, the plug comprises a large end and a small end, the plug and one end of the resilient member are received in the receiving hole, the small end of the plug capable of passing through the through hole of the supporting member.

10. The electronic device as claimed in claim 9, wherein a slot is defined in a circumference of the receiving portion perpendicular to the axis of the receiving portion and communicating with the receiving hole, the latch member comprises a latch portion for engaging in the slot of the receiving portion to engage with the hook when covering the cover unit to the base unit.

* * * * *